UNITED STATES PATENT OFFICE.

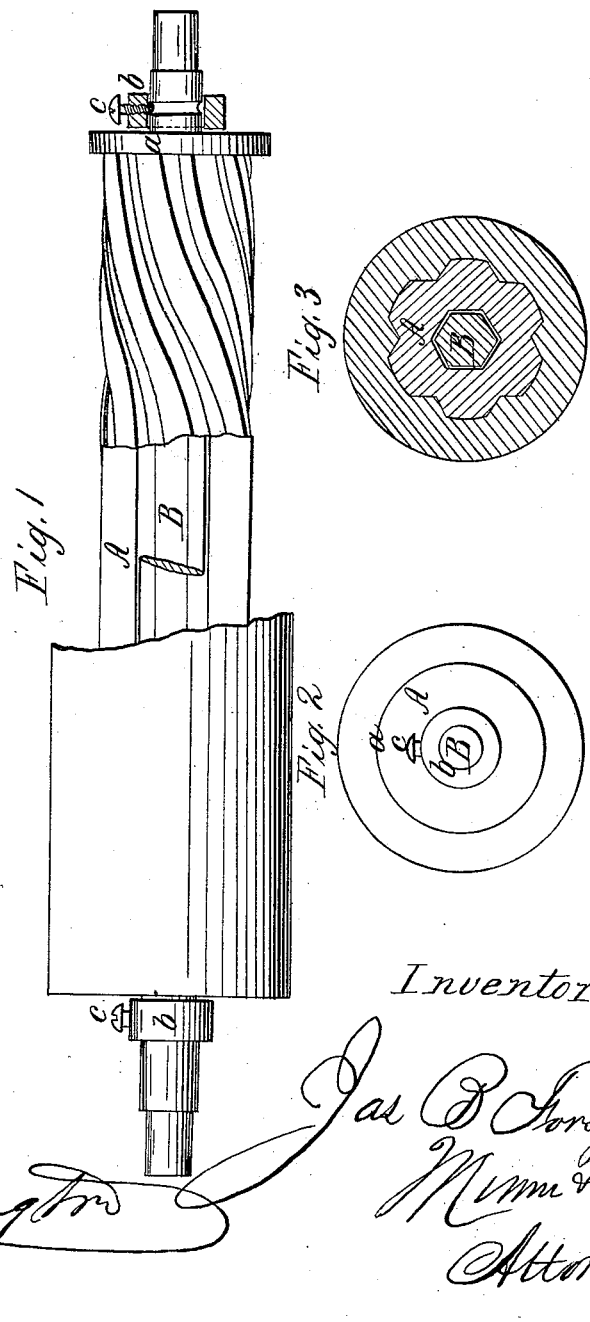

JAMES B. FORSYTH, OF ROXBURY, MASSACHUSETTS.

ROLLER FOR WRINGERS.

Specification forming part of Letters Patent No. 52,153, dated January 23, 1866.

*To all whom it may concern:*

Be it known that I, JAMES B. FORSYTH, of Roxbury, in the county of Norfolk and State of Massachusetts, have invented a new and useful Improvement in Rolls for Clothes-Wringers, &c.; and I do hereby declare that the following is a full, clear, and exact description thereof, which will enable others skilled in the art to make and use the same, reference being had to the accompanying drawings, forming part of this specification, in which—

Figure 1 represents a side elevation of this invention, partly in section. Fig. 2 is an end view of the same. Fig. 3 is a transverse vertical section of the same.

Similar letters of reference indicate like parts.

This invention relates to certain improvements in rolls for clothes-wringers or other machines, which rolls are made of india-rubber or other vulcanizable gum.

The invention consists in a roll made of india-rubber or other vulcanizable gum, with a tube, thimble, or hollow core fastened in the same during the process of curing, or in any other suitable manner, said tube, thimble, or hollow core being made in one piece or in sections, and so formed as to receive a shaft or mandrel, which may be made to pass wholly or partially through the same.

It consists, further, in curing a roll made of india-rubber or other vulcanizable gum on a hollow metallic core in such a manner that the heat is equally diffused throughout the mass of vulcanizable gum, and the articles produced are of superior elasticity and toughness.

It consists, also, in the application of adjustable collars to the ends of the shaft for the purpose of holding the same in the tubes or the tube, and to allow of removing the same whenever it may be desirable.

In making my roll I first procure a tube or thimble, A, of cast-iron or any other suitable material, with a hole through its inside to receive the shaft or mandrel B. Said thimble is intended to form the core of the roll to be produced, and it may be made in one piece or in several sections, according to convenience. The outer surface of the core may be rough or grooved, and previous to applying the gum I apply to it a thin coat of varnish or cement and let it dry, the cavities or grooves in its surface being first filled with gum, so as to produce an even surface. I then lay on the sheets or layers of india-rubber or other vulcanizable gum, which adheres to the varnish or cement and to the gum in the grooves or cavities, (if there are such,) and then I continue to roll up till I arrive at the size desired. After this is done the roll C is wrapped up in cloth or other suitable material, or put into a mold, and cured or vulcanized. By curing on the hollow metallic core or tube the heat is equally diffused throughout the mass, and the process of curing is carried on with little trouble or loss of time and without danger of producing inferior or half-cured articles. By the curing process the hollow core is firmly embedded in the gum, so that the same cannot work loose or become displaced.

By inserting the shaft or mandrel B into the hollow core and applying power to said shaft the roll is compelled to revolve. It will be observed that the shaft or mandrel may also be made in sections, and it is not absolutely necessary that the same shall extend clear through the roll, though I use, by preference, a solid shaft extending clear through.

The hole or opening in the hollow core may be of any suitable shape or form, either three, four, or more sided, or it may be provided with a feather-key to fit into a corresponding groove in the shaft, or the key may be secured in the shaft and the groove made in the tube or core, or any other suitable device may be applied to compel the core to revolve with the shaft.

In order to prevent the roll from working off endwise, the tube or core is provided with shoulders *a* at both ends, which, however, when the roll is finished, are embedded in the gum and not visible. The shaft or mandrel B is retained in the tube or core by collars *b*, which are adjusted on its ends, being held in place by set-screws *c*, or by any other suitable fastening. By these means I am enabled to remove the shafts from the rolls whenever it may be desirable, and if one of the rolls should wear out or become damaged it can easily be replaced without throwing away the shaft and all.

I do not claim, broadly, curing or vulcanizing india-rubber or other gum on a mandrel or shaft; but

What I claim as new, and desire to secure by Letters Patent, is—

1. A roller in which the core is permanently secured independently of the shaft, and which, together with its core, can be removed from the shaft or attached to the same, substantially as described.

2. The adjustable collars $b$, in combination with the shaft or mandrel B, tube or hollow core A, and roller, substantially as and for the purpose set forth.

The above specification of my invention signed by me this 30th day of October, 1865.

JAMES B. FORSYTH.

Witnesses:
M. M. LIVINGSTON,
WM. E. LYON.